United States Patent [19]

Kanter et al.

[11] Patent Number: 4,818,734
[45] Date of Patent: Apr. 4, 1989

[54] METHOD FOR IN SITU TAILORING THE METALLIC COMPONENT OF CERAMIC ARTICLES

[75] Inventors: Robert C. Kanter; Michael A. Rocazella; Jerry G. Weinstein, all of Newark, Del.; Danny R. White, Elkton, Md.

[73] Assignee: Lanxide Technology Company, LP, Newark, Del.

[21] Appl. No.: 152,518

[22] Filed: Feb. 5, 1988

Related U.S. Application Data

[63] Continuation-in-part of Ser. No. 908,454, Sep. 17, 1986.

[51] Int. Cl.$^4$ ............................................. C04B 35/44
[52] U.S. Cl. .................................... 501/128; 501/126; 501/127; 501/132; 501/153; 264/60; 264/65
[58] Field of Search ................ 501/126, 127, 128, 132, 501/153; 264/60, 65

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 264/65 |
| 3,296,002 | 1/1967 | Hare | 501/80 |
| 3,298,842 | 1/1967 | Seufert | 501/127 |
| 3,419,404 | 12/1968 | Mao | 501/98 |
| 3,421,863 | 1/1969 | Bawa | 501/128 |
| 3,437,468 | 4/1969 | Seufert | 75/235 |
| 3,473,938 | 10/1969 | Oberlin | 264/65 |
| 3,473,987 | 10/1969 | Sowards | 501/119 |
| 3,789,096 | 1/1974 | Church | 264/60 |
| 3,864,154 | 2/1975 | Gazza et al. | 29/123 |
| 3,973,977 | 8/1976 | Wilson | 501/120 |
| 4,713,360 | 12/1987 | Newkirk et al. | 501/128 X |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 0193292 | 3/1986 | European Pat. Off. . |
| 0245192 | 11/1987 | European Pat. Off. . |

OTHER PUBLICATIONS

"Oxidation of Molten Aluminum Alloys. Reaction with Refractories"-M. Drouzy and M. Richard-Mar., 1974-Fonderie, France, No. 332, pp. 121-128.
"Refractories for Aluminum Alloy Melting Furnaces'-'-B. Clavaud and V. Jost-Sep., 1980-Lillian Brassinga (from French), Jan., 1985.

Primary Examiner—William R. Dixon, Jr.
Assistant Examiner—Karl Group
Attorney, Agent, or Firm—Mark G. Mortenson; William E. McShane

[57] ABSTRACT

There is disclosed a method for producing a self-supporting ceramic body by oxidation of a molten precursor metal with a vapor-phase oxidant to form an oxidation reaction product and inducing a molten flux comprising said molten precursor metal through said oxidation reaction product. A second metal is incorporated into said molten flux during the oxidation reaction. The resulting ceramic body includes sufficient second metal such that one or more properties of said ceramic body are at least partially affected by the presence and properties of said second metal in the metallic constituent.

15 Claims, No Drawings

METHOD FOR IN SITU TAILORING THE METALLIC COMPONENT OF CERAMIC ARTICLES

CROSS-REFERENCE TO RELATED APPLICATIONS

This application is a continuation-in-part application of U.S. patent application Ser. No. 908,454, filed Sept. 17, 1986, in the names of Marc S. Newkirk, et al. and entitled "Method for In Situ Tailoring the Metallic Component of Ceramic Articles and Articles Made Thereby". The entire disclosure of the above-mentioned Commonly Owned Patent Application is incorporated by reference herein.

FIELD OF THE INVENTION

This invention relates to a novel method for producing self-supporting ceramic and ceramic composite bodies, formed by the oxidation reaction of a precursor metal and a vapor-phase oxidant, and having a metallic component including a second metal introduced during formation of the ceramic body to impart certain properties to the ceramic body. The invention also relates to ceramic and ceramic composite bodies produced by the novel method.

BACKGROUND OF THE INVENTION AND COMMONLY OWNED PATENT APPLICATIONS

In recent years, there has been an increasing interest in the use of ceramics for structural applications historically served by metals. The impetus for this interest has been the superiority of ceramics with respect to certain properties, such as corrosion resistance, hardness, modulus of elasticity, and refractory capabilities, when compared with metals.

Current efforts at producing higher strength, more reliable, and tougher ceramic articles are largely focused upon (1) the development of improved processing methods for monolithic ceramics and (2) the development of new material compositions, notably ceramic matrix composites. A composite structure is one which comprises a helerogeneous material, body or article made of two or more different materials which are intimately combined in order to attain desired properties of the composite. For example, two different materials may be intimately combined by embedding one in a matrix of the other. A ceramic matrix composite structure typically comprises a ceramic matrix which incorporates one or more diverse types of filler materials such as particulates, fibers, rods, and the like.

There are several known limitations or difficulties in substituting ceramics for metals, such as scaling versatility, capability to produce complex shapes, satisfying the properties required for the end use application, and costs. Several copending patent applications and one issued patent assigned to the same owner as this application (hereinafter referred to as Commonly Owned Patent Applications), overcome these limitations or difficulties and provide novel methods for reliably producing ceramic materials, including composites. The method is disclosed generically in Commonly Owned U.S. Pat. No. 4,713,360, issued on Dec. 15, 1987 and entitled "Novel Ceramic Materials and Methods for Making Same". This Patent discloses a method of producing self-supporting ceramic bodies grown as the oxidation reaction product of a molten parent precursor metal which is reacted with a vapor-phase oxidant to form an oxidation reaction product. Molten metal migrates through the formed oxidation reaction product to react with the oxidant thereby continuously developing a ceramic polycrystalline body which can, if desired, include an interconnected metallic component. The process may be enhanced by the use of one or more dopants alloyed with the parent metal. For example, in the case of oxidizing aluminum in air, it is desirable to alloy magnesium and silicon with the aluminum to produce $\alpha$-alumina ceramic structures. This method was improved upon by the application of dopant materials to the surface of the precursor metal, as described in Commonly Owned and Copending U.S. patent application Ser. No. 822,999, filed Jan. 27, 1986, which is a continuation-in-part of Ser. No. 776,965, filed Sept. 17, 1985, now abandoned which is a continuation-in-part of Ser. No. 747,788, filed June 25, 1985, now abandoned which is a continuation-in-part of Ser. No. 632,636, filed July 20, 1984, now abandoned all in the names of Marc S. Newkirk et al and entitled "Methods of Making Self-Supporting Ceramic Materials".

This oxidation phenomenon was utilized in producing ceramic composite bodies as described in Commonly Owned and Copending U.S. patent application Ser. No. 819,397, filed Jan. 17, 1986, which is a continuation-in-part of Ser. No. 697,876, filed Feb. 4, 1985, now abandoned both in the names of Marc S. Newkirk et al and entitled "Composite Ceramic Articles and Methods of Making Same". These applications disclose novel methods for producing a self-supporting ceramic composite by growing an oxidation reaction product from a precursor metal into a permeable mass of filler, thereby infiltrating the filler with a ceramic matrix. The resulting composite, however, has no defined or predetermined geometry, shape, or configuration.

A method for producing ceramic composite bodies having a predetermined geometry or shape is disclosed in Commonly Owned and Copending U.S. patent application Ser. No. 861,025, filed May 8, 1986, in the names of Marc S. Newkirk et al. In accordance with the method in this U.S. Patent Application, the developing oxidation reaction product infiltrates a permeable preform of filler material in the direction towards a defined surface boundary. It was discovered that high fidelity is more readily achieved by providing the preform with a barrier means, as disclosed in Commonly Owned and Copending U.S. patent application Ser. No. 861,024, filed May 8, 1986, in the names of Marc S. Newkirk et al. This method produces shaped self-supporting ceramic bodies, including shaped ceramic composites, by growing the oxidation reaction product of a precursor metal to a barrier means spaced from the metal for establishing a boundary or surface. Ceramic composites having a cavity with an interior geometry inversely replicating the shape of a positive mold or pattern are disclosed in Commonly Owned and Copending U.S. patent application Ser. No. 823,542, filed Jan. 27, 1986, in the names of Marc S. Newkirk, et al, and in U.S. patent application Ser. No. 896,157, filed Aug. 13, 1986, in the name of Marc S. Newkirk.

The above-discussed Commonly Owned Patent Applications disclose methods for producing ceramic and/or ceramic composite articles which overcome some of the traditional limitations or difficulties in producing ceramic articles as substitutes for metals in end-use applications.

Common to each of these Commonly Owned Patent Applications is the disclosure of embodiments of a ceramic body comprising an oxidation reaction product interconnected in one or more dimensions (usually in three dimensions) and, if desired, one or more metallic constituents or components. The volume of metal, which typically includes non-oxidized constituents of the parent metal and/or metal reduced from an oxidant or filler, depends on such factors as the temperature at which the oxidation reaction product is formed, the length of time during which the oxidation reaction is allowed to proceed, the composition of the parent metal, the presence of dopant materials, the presence of reduced constituents of any oxidant or filler materials, etc. Some of the metallic components can be isolated or enclosed, but also a substantial volume percent of metal can be interconnected and accessible, or rendered accessible, from an external surface of the ceramic body. It has been observed for these ceramic bodies that this metal-containing component or constituent (both isolated and interconnected) can range from about 1 to about 40 percent by volume, and sometimes higher. The metallic component can impart certain favorable properties to, or improve the performance of, the ceramic articles in many product applications. For example, the presence of metal in the ceramic structure may have a substantial benefit with respect to imparting fracture toughness, thermal conductivity, or electrical conductivity to the ceramic body.

The present invention discloses a method for tailoring the constituency of the metallic component (both isolated and interconnected) of such ceramics during formation of the ceramic body to impart one or more desirable characteristics to the resulting ceramic body. Thus, desired performance characteristics for the ceramic body are advantageously achieved by incorporating the desired metallic component in situ, rather than from an extrinsic source, or by post-forming.

The entire disclosures of all of the foregoing Commonly Owned Patent Applications are expressly incorporated herein by reference.

DEFINITIONS

As used herein in the specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body contains minor or substantial amounts of one or more metallic constituents (isolated and/or interconnected), most typically within a range of from about 1–40% by volume, but may include still more metal.

"Oxidation reaction product" means one or more metals in any oxidized state wherein the metal(s) has given up electrons to or shared electrons with another element, compound, or combination thereof. Accordingly, an "oxidation reaction product" under this definition includes the product of reaction of one or more metals with an oxidant such as oxygen, nitrogen, a halogen, sulphur, phosphorus, arsenic, carbon, boron, selenium, tellurium, and compounds and combinations thereof, for example, methane, ethane, propane, acetylene, ethylene, propylene (the hydrocarbon as a source of carbon), and mixtures such as air, $H_2/H_2O$ and $CO/CO_2$ (as sources of oxygen), the latter two (i.e., $H_2/H_2O$ and $CO/CO_2$ being useful in reducing the oxygen activity of the environment.

"Vapor-phase oxidant", which identifies the oxidant as containing or comprising a particular gas or vapor, means an oxidant in which the identified gas or vapor is the sole, predominant or at least a significant oxidizer of the precursor metal under the conditions obtained in the oxidizing environment utilized. For example, although the major constituent of air is nitrogen, the oxygen content of air is the sole oxidizer for the precursor metal because oxygen is a significantly stronger oxidant than nitrogen. Air therefore falls within the definition of an "oxygen-containing gas" oxidant but not within the definition of a "nitrogen-containing gas" oxidant as those terms are used herein and in the claims. An example of a "nitrogen-containing gas" oxidant is "forming gas", which typically contains about 96 volume percent nitrogen and about 4 volume percent hydrogen.

"Precursor metal" refers to the metal which reacts with the vapor-phase oxidant to form the polycrystalline oxidation reaction product, and includes that metal as a relatively pure metal or a commercially available metal with impurities; and when a specified metal is mentioned as the precursor metal, e.g. aluminum, the metal identified should be read with this definition in mind unless indicated otherwise by the context.

"Second or foreign metal" means any suitable metal, combination of metals, alloys, intermetallic compounds, or sources of either, which is, or is desired to be, incorporated into the metallic component of a formed ceramic body in lieu of, in addition to, or in combination with unoxidized constituents of the precursor metal. This definition includes intermetallic compounds, alloys, solid solutions or the like formed between the precursor metal and a second metal.

A metal "different" from the precursor metal is a metal which does not contain, as a primary constituent, the same metal as the precursor metal, e.g. if the primary constituent of the precursor metal is aluminum, the "different" metal could have a primary constituent of, for example, nickel.

"Flux" of molten metal means the flow or transport of molten metal within the oxidation reaction product, induced by the process conditions. "Flux" as used herein is not meant to define a substance as used in reference to classical metallurgy.

"Precursor metal carcass" refers to any remaining precursor metal which has not been consumed during formation of the ceramic or ceramic composite body, and typically, which remains in at least partial contact with the formed ceramic or ceramic composite body. It should be understood that the carcass may also typically include some oxidized constituents of the precursor metal and/or a second or foreign metal therein.

SUMMARY OF THE INVENTION

In accordance with the present invention, there is provided a method for producing a self-supporting ceramic body by the oxidation of a precursor metal, wherein said body comprises the oxidation reaction product of a molten precursor metal with a vapor-phase oxidant, and a metallic component. A second or foreign metal is introduced or incorporated into the metallic component of the ceramic body during the formation of the ceramic body in a quantity sufficient to at least partially affect one or more properties of the ceramic body.

Generally, in the method for producing a self-supporting ceramic body by the oxidation of a precursor metal, the precursor metal is heated in the presence of a vapor-phase oxidant to form a body of molten metal. The molten precursor metal is reacted with the oxidant, at a suitable temperature, to form an oxidation reaction product, which product is maintained at least partially in contact with, and extends between, the body of molten precursor metal and the vapor-phase oxidant. At this temperature, molten precursor metal is transported through the oxidation reaction product towards the vapor-phase oxidant to continue the reaction. During the process, a second or foreign metal is incorporated into the flux of molten metal (described below in detail) and thence into the resulting metallic constituent of the ceramic body. The resulting metallic constituent, comprising molten precursor metal and foreign metal, is transported through the oxidation reaction product, and the precursor metal oxidizes as it contacts the vapor-phase oxidant thereby continuously developing a ceramic polycrystalline body. The oxidation reaction is continued for a time sufficient to form a self-supporting ceramic body comprising the oxidation reaction product and a metallic component. The metallic constituent or component comprises nonoxidized constituents of the precursor metal and the second or foreign metal which is present in a significant quantity such that one or more properties of the ceramic body are at least partially affected by the presence and/or properties of the second or foreign metal. By reason of the process of this invention, the ceramic body exhibits one or more predetermined or desired properties.

In accordance with the present invention, the second or foreign metal is introduced into the flux of molten precursor metal during the formation of the ceramic body, and is transported with molten precursor metal through the oxidation reaction product. A portion of the precursor metal reacts with the vapor-phase oxidant to form the oxidation reaction product while the foreign metal remains substantially unoxidized by the vapor-phase oxidant, and typically is dispersed throughout the metal component. Upon formation of the ceramic body, the second or foreign metal, as a constituent of the metallic component, is an integral part of the ceramic body, thereby altering or improving one or more properties of the product.

In another aspect of the present invention, a second metal is incorporated into the flux of molten precursor metal and thence into the ceramic body. During the process, molten precursor metal is converted to oxidation reaction product, and the oxidation reaction is continued for a time sufficient to deplete the amount of precursor metal in the flux of molten metal, relative to the amount of second metal present in the flux, thereby leading to the formation of one or more desired metallic phases comprising the second metal and precursor metal within the metallic component of the ceramic body. The desired phase formation can occur at or within the range of the reaction temperature, on post-process cooling or heat treatment of the ceramic body, or during service or application of the ceramic product fabricated in accordance herewith. The resulting ceramic body has a metallic component having therein incorporated one or more metallic phases which impart one or more predetermined desired properties to the ceramic product.

The second or foreign metal may be provided for incorporation into the flux of molten metal or ceramic body by any one of several means, or a combination of means. The second or foreign metal may be alloyed with the precursor metal in a pre-process step, which is intended to include employing commercially available precursor metal alloys having a desired composition, or may be applied onto one or more surfaces of the precursor metal, preferably the growth surface of the precursor metal. During the oxidation reaction process, the second or foreign metal is incorporated into the flux of molten metal, is transported into the oxidation reaction product, and becomes an integral part of the interconnected metallic component and thus of the ceramic body.

In another embodiment, wherein a composite is formed, and the oxidation reaction product is grown into a mass of filler material or a shaped preform, the second metal may be provided by admixing it with the filler or preform material, or may be applied to one or more of its surfaces. As the oxidation reaction product infiltrates the filler material, and thus the molten metal is transported through the developing oxidation reaction product, the molten precursor metal contacts the second metal (or its source). On contact, the second metal, or some portion thereof, is introduced or incorporated into the flux of molten precursor metal and transported along with it into the ceramic matrix. The precursor metal, or a portion thereof, continues to be oxidized by the vapor-phase oxidant at the interface between the vapor-phase oxidant and previously formed oxidation reaction product, while the second metal is being transported in the flux within the formed composite. Hence the second or foreign metal is incorporated into the flux of molten metal.

In still another embodiment, the second or foreign metal is provided in the form of a compound or mixture which reacts with the molten metal, and/or dissociates under process conditions, to liberate the second metal which is then introduced or incorporated into the flux of molten metal. Such a compound, for example, may be a metal oxide (i.e., a single, binary, ternary or higher order metal oxide) which is reducible by the molten precursor metal. This compound may be applied in a layer on top of the precursor metal body, or admixed with or applied to a filler or preform material.

DETAILED DESCRIPTION OF THE INVENTION AND PREFERRED EMBODIMENTS

In accordance with the present invention, the precursor metal, which may be doped (as explained below in greater detail), and is the precursor to the oxidation reaction product, is formed into an ingot, billet, rod, plate, or the like; and is placed into a setup of an inert bed, crucible or other refractory container. It has been discovered that a second or foreign metal can be introduced into the flux of molten precursor metal during formation of the ceramic body. The resulting constituency comprising precursor metal and second metal is transported through the oxidation reaction product by the flux of molten metal which includes capillary transport of the molten metal, as described in the Commonly Owned Patent Applications. Thus, the second or foreign metal becomes an integral part of the metallic component of the formed ceramic body.

A predetermined quantity of a second metal is provided to the setup comprising precursor metal, refractory containment vessel, and optionally a composite filler material or preform, by (1) pre-process alloying or mixing of the second metal with the precursor metal or employing a commercially available alloy having a desired composition, (2) applying the second metal on one or more surfaces of the precursor metal, or (3) in cases where a composite is formed, by admixing the second metal with the filler or preform material (which techniques are discussed in greater detail below) such that a desired quantity of second metal will be introduced into the flux of molten precursor metal and transported through the oxidation reaction product which is formed as described in the above-referenced Commonly Owned Patent Applications. The ceramic body is recovered having a metallic component comprising the second metal and unoxidized constituents of the precursor metal. The metallic component of the formed ceramic body comprises interconnected and/or isolated metallic inclusions.

In the practice of the present invention, the choice of second metal is based primarily upon one or more properties sought for the ceramic body. The metal component can impart certain favorable properties to, or improve the performance of, the formed ceramic body with respect to its intended use. For example, metal in the ceramic body can beneficially improve the fracture toughness, thermal conductivity, environmental compatibility, and electrical conductivity of the ceramic body, depending upon such factors as the identity of the metal and the amount and distribution of the metal throughout the microstructure of the ceramic body. By providing a method for tailoring the constituency of the metal to include metals or metallic phases other than the precursor metal, the invention adds substantial latitude to the end-use application of such ceramic bodies. In order to impart the desired property(ies) to the formed ceramic body, the second or foreign metal remains substantially nonreactive with the vapor-phase oxidant. Therefore, second metals should be chosen which do not form an oxidation reaction product preferentially to the precursor metal under the particular process conditions used. Typically, a second metal satisfies that criterion if its oxide has a less negative free energy of formation (per oxygen atom) at a given reaction temperature than that of the precursor metal, with respect to the particular oxidation reaction occurring with the vapor-phase oxidant present.

The second or foreign metal may alloy or react with the precursor metal within the metallic component to form alloys or intermetallic compounds, which may be desirable, or impart desirable attributes to the resulting ceramic body. Thus, in accordance with the present invention, there is also provided a method for the in situ formation of one or more desired metallic phases comprising the precursor metal and the second metal. Such metallic phases include intermetallic compounds, solid solutions, alloys or combinations of each. In the present embodiment, a suitable second metal is selected satisfying the criteria set out above and, additionally, which forms one or more metallic phases in combination with the precursor metal, at a given temperature and relative concentration, which are desirable to be incorporated into the ceramic body. The second metal is provided and introduced into the flux of molten precursor metal in a lower relative concentration than is needed to form the desired metallic phase or phases. As the molten precursor metal reacts with the vapor-phase oxidant at a given reaction temperature, forming the oxidation reaction product, the relative concentration of precursor metal within the interconnected metallic constituency is depleted or reduced. Therefore, the relative concentration of the second metal increases within the metallic constituency of the ceramic body. The reaction is continued at a given reaction temperature or within a temperature range until a sufficient quantity of precursor metal has been depleted from the constituency leading to the formation of a desired metallic phase, thereby forming or enriching the desired metallic phase comprising, in some cases, the precursor metal and second metal; or, alternatively, the oxidation reaction can be continued for a time sufficient to deplete an amount of precursor metal such that on reducing the reaction temperature, or cooling the formed ceramic body, the desired metallic phase formation occurs, thus forming or enriching the desired metallic phase comprising, in some cases, the precursor metal and second metal. The resulting metallic phase or phases can either inherently impart a desirable property or properties to the ceramic body, or can be of such a composition that will form one or more additional phases at a given service temperature, thereby imparting the desired property or properties to the ceramic body. Additionally, by the manipulation of reaction parameters, i.e. reaction time, reaction temperature, etc., or by the appropriate combination or addition of certain metals, the desired metallic phase(s) can be further tailored as in, for example, precipitation hardening of a desired alloy within the metallic component.

It should be understood that in the practice of the present invention, it may be necessary to provide a greater quantity of second metal in a setup than is desired or needed to be incorporated into the metallic component of the ceramic body. The amount of second metal which needs to be provided in the setup in order that the desired quantity of second metal will be introduced into the flux of molten precursor metal, and thus be incorporated into the ceramic body, will depend primarily upon the identities and interactive properties of the second metal and precursor metal, reaction conditions, and the means by which the second metal is provided.

Since the method herein disclosed of incorporating a second metal into the metallic component of a ceramic body involves the intimate combination of two or more metals, viz. the second metal and precursor metal, it should be understood that the latitude afforded with respect to the identity, quantity, form, and/or concentration of second metal relative to the precursor metal to be employed will depend upon the metallic constituents which are desired to be incorporated into the ceramic body, and the process conditions necessary for the formation of the oxidation reaction product. The inclusion and/or formation of the desired metallic constituents will be governed, at least in part, by the properties and/or physical metallurgy associated with the combination or interaction of the particular metals present under the particular process conditions, and/or the means chosen to provide the second metal for introduction to the precursor metal. This combination of metals may effect the formation of various metallic phases, including alloys, intermetallic compounds, solid solutions (including relatively pure elements), precipitates, or mixtures thereof, and may be affected by the presence and concentration of impurities or dopant materials. Thus, the constituency resulting from combination of the metals in the practice of the present invention can have properties which vary significantly from those of the several metals individually. Such combinations in the form of metallic phases comprising the precursor metal and second metal incorporated into the metallic component of the formed ceramic body can advantageously affect properties of the ceramic body. For example, the combination of second metal and precursor metal may form metallic phases such as solid solutions, alloys or one or more intermetallic compounds which have a melting point above that of the precursor metal, thereby expanding the service temperature range of a ceramic body having such a metallic phase incorporated therein. Moreover, it should be understood that in some cases the melting point of the resulting metallic phase or phases may be above the operable temperature range for the formation of the intended oxidation reaction product. Additionally, the formation of metallic phases resulting from certain combinations of parent and second metals may impart added viscosity to the resulting molten metal at the reaction temperature, as compared with molten precursor metal without the addition of second metal at the same temperature, such that the transport of molten metal through the formed oxidation reaction product substantially slows or does not occur. As such, care should be taken with respect to designing a desired system which includes such a metallic combination in order to ensure that the metallic constituency remains sufficiently liquid while the oxidation reaction product is being formed to facilitate the continued flux of molten metal at a temperature which is compatible with the parameters of the oxidation reaction process.

When providing the second metal by pre-process alloying with the precursor metal, or employing a commercially available alloy of desired composition, introduction of the second metal into the flux of molten metal is effected by the transport of molten metal from the body of molten metal into the formed oxidation reaction product. Thus, introduction will depend upon the constituency of the molten metal which is transported from the body of molten metal, formed in the heating step, into the formed oxidation reaction product. This transported constituency will be determined by such factors as the homogeneity of the metallic constituency, and the metallic phases associated with the particular combination of metals chosen at a given reaction temperature and relative concentration.

In embodiments of the present invention wherein the second metal, or source of same, is provided external to the precursor metal, additional parameters should be considered. More specifically, one should consider the metallurgical properties associated with the contact of the molten precursor metal with the second metal in order to effect introduction of the desired quantity of second metal into the flux of molten precursor metal. When the second metal is provided external to the precursor metal body, introduction may be effected on contact of the molten precursor metal with the second metal by dissolution of one metal into the other, interdiffusion of the two metals, or reaction of the two metals as in the formation of one or more intermetallic compounds or other metallic phases between the precursor metal and second metal. Thus, the introduction and/or rate of introduction of second metal into the flux of molten precursor metal will depend on one or more of several such metallurgical factors. Such factors include the physical state of the second metal at the particular reaction temperature, the rate of interdiffusion between the precursor metal and second metal, the degree and/or rate of solubility of the second metal into the precursor metal or the precursor metal into the second metal, and the formation of intermetallics or other metallic phases between the precursor metal and second metal. Thus, care should be taken to ensure that the reaction temperature is maintained such that the metallic constituency, resulting from the introduction of second metal into the flux of molten precursor metal, remains at least partially liquid to facilitate the transport of the metallic constituency into the formed oxidation reaction product, and thus enable contact of the molten precursor metal with the vapor-phase oxidant in order to facilitate growth of the ceramic body. In accordance with the present invention, the introduction of second metal into the flux of molten precursor metal, or the depletion of precursor metal from the flux of molten metal due to formation of the oxidation reaction product, can result in the formation of one or more metallic phases comprising the precursor metal and second metal. However, certain combinations of precursor metal and second metal may impart significant viscosity to the flux, or otherwise impede the flux of molten metal such that transport of metal toward the vapor-phase oxidant ceases prior to the complete development of the desired oxidation reaction product. In such cases, the formation of the desired oxidation reaction product may be halted or substantially slowed by those phenomena and, therefore, care should be exercised to avoid the premature formation of such constituents.

As explained above in accordance with the present invention, the desired quantity of a second or foreign metal may be provided by alloying with the precursor metal prior to the fabrication process. For example, in a system wherein aluminum (or an aluminum-based metal) is the precursor metal employing air as the vapor-phase oxidant to form an alumina oxidation reaction product, second metals such as titanium, copper, nickel, silicon, iron, or chromium may be alloyed, in amounts which may be limited and/or dictated as discussed above, with the aluminum precursor metal. It may be desirable, for example, to include copper, or a metallic phase including copper, in the metallic component of the ceramic body. In order for the metallic component to impart one or more properties to, or improve the performance of, a ceramic body, it is desirable that properties of the particular metal, combination of metals or metallic phases incorporated into the metallic component do not substantially degrade at the service temperature of the ceramic product. Certain aluminum-copper metallic phases, for example, $Cu_9Al_4$, have a service temperature range which is higher than that of aluminum. Thus, by incorporating or enriching such a phase within the interconnected metallic component of the ceramic, the improved performance of the ceramic due to the presence of the metallic component will be exhibited at increased service temperatures. To incorporate a suitable quantity of copper in order to effect the desired phase transformation(s) to obtain the desired aluminum-copper metallic phase $Cu_9Al_4$, the copper may be alloyed with the aluminum precursor metal, for example, at 10% by weight of the total copper-aluminum alloy. The alloy comprising the aluminum precursor metal and the second metal copper is heated below the melting point of the intended oxidation reaction product, alumina, but above the melting point of the copper-aluminum alloy (as described in above-referenced Commonly Owned Patent Applications). When the molten aluminum precursor metal is contacted with the oxidant, there is formed a layer comprising alumina as the oxidation reaction product. Molten alloy is then transported through the formed oxidation reaction product, towards the oxidant. As the molten alloy contacts the air oxidant, the aluminum metal constituent of the alloy is at least partially oxidized thus forming a progressively thicker layer of oxidation reaction product. The second or foreign metal copper, also being a constituent of the molten alloy, is likewise transported into the formed oxidation reaction product. However, since the copper is not depleted from the ceramic body by the oxidation reaction, the relative concentration of the copper increases as the aluminum is oxidized and thus depleted from the flux of molten metal. The oxidation of the aluminum metal is continued for a time sufficient to form the desired ceramic body and to achieve the appropriate metallic constituency for the formation of the desired metallic phases. Referring to a binary metallic phase diagram for a copper aluminum system, the $Cu_9Al_4$ phase is formed in a relative concentration range of approximately 80-85% copper, balance aluminum, in a service temperature range for the ceramic body not exceeding approximately 780° C.

Where the desired quantity of second or foreign metal is applied, as in layering, or contacted with, one or more surfaces of an aluminum precursor metal, and the precursor metal is reacted with air as the vapor-phase oxidant, suitable second metals, include for example, silicon, nickel, titanium, iron, copper, or chromium, preferably in powder or particulate form. For example, nickel or a metallic phase containing nickel may be a desirable constituent in a ceramic body fabricated in accordance with the present invention. Nickel-aluminide intermetallics such as NiAl, $Ni_2Al_3$ or $NiAl_3$ might be desirable to improve the corrosion resistance of the metallic component of the ceramic body. Therefore, in order to effect the introduction of a suitable quantity of nickel to form or enrich the desired nickel-aluminum metallic phases, a predetermined quantity of powdered nickel metal is dispersed over the growth surface of the aluminum precursor metal body. As the molten aluminum precursor metal contacts the nickel metal, an amount of the nickel metal is introduced into the flux of molten aluminum precursor metal. The introduced nickel metal is then transported, as a constituent of the flux of molten metal, into the alumina oxidation reaction product. Analogous to the copper example above, as the aluminum metal is oxidized, the relative concentration of nickel metal within the forming ceramic body increases, and the appropriate composition is achieved to form the desired phases.

Where the product is a ceramic composite, fabricated by growing the oxidation reaction product into a mass or aggregate of filler material, or a permeable preform, placed adjacent to the precursor metal, the second or foreign metal may be provided by admixing with the filler material or preform material, or applied, as in layering, to one or more surfaces of same. For example, if the desired composite product comprises an alumina ceramic matrix, fabricated by the oxidation of aluminum precursor metal (with a vapor-phase oxidant) into a bed of silicon carbide particles, which may be preformed into a green body, powders or particles of second metals such as titanium, iron, lead, nickel, copper, chromium, or silicon can be admixed with the silicon carbide filler material. For example, it may be desirable to incorporate an amount of silicon into the ceramic body in order to improve the compatibility of the metallic component of the composite ceramic body with high temperature applications. Therefore, a quantity of silicon metal (i.e., elemental silicon), which may be limited or governed as discussed above, is admixed with the silicon carbide filler material. As the formed alumina oxidation reaction product embeds the silicon carbide particles, and the molten aluminum is transported therethrough, the molten aluminum metal contacts the admixed silicon metal. A quantity of silicon metal is thus introduced into the continued flux of molten metal, and thus into the forming ceramic composite body. In the present embodiment, the portion of the second metal which is not introduced into the flux of molten metal, but is included in that portion of the mass of filler or preform which is infiltrated by the oxidation reaction product, may be present in the composite body as isolated inclusions of second metal. The second or foreign metal may also be applied on only one or more surfaces of a mass or aggregate of filler or shaped preform. For this composite example, the silicon particulate or powder is applied as a layer onto a surface of the silicon carbide particles or a preform comprising particles of same. As the flux of molten aluminum precursor metal contacts this surface, a quantity of silicon metal is introduced into the flux and becomes a part of the metallic component in the recovered ceramic composite body. Application of second metal to one or more surfaces of a mass of filler or preform in accordance with the present embodiment can result in a composite body wherein the exposed portions of the metallic component are rich in the second or foreign metal relative to other portions of metallic component within the formed ceramic composite body.

In the practice of the present invention wherein the second or foreign metal is provided external to the precursor metal, the second or foreign metal can be provided in the form of a mixture or compound which will react with the molten metal, and/or dissociate under process conditions, to liberate the second or foreign metal which is then introduced, as discussed above, into the flux of molten metal. Such a compound may be a metal oxide which is reducible by, or will react with, the precursor metal to liberate the second metal. For example, if a ceramic composite body is desired comprising an alumina ceramic matrix, fabricated by the oxidation of aluminum precursor metal, to embed particles of alumina filler material, an oxide (i.e., a single, binary, ternary or higher order oxide) of a desired second metal such as silicon, nickel, iron, or chromium may be admixed with the alumina bedding material, or layered on top of the aluminum precursor metal. For example, if chromium is desired as a second metal, chromium metal can be introduced into the flux of molten metal by admixing chromium oxide with a bedding material. When the flux of the molten aluminum contacts the chromium oxide, the molten aluminum will reduce the chrome oxide and liberate chromium metal. A quantity of the liberated chromium metal is then introduced into the flux of molten aluminum, as discussed above, and transported through and/or into the oxidation reaction product which is formed as the molten aluminum precursor metal continues to contact the vapor-phase oxidant.

As explained in the Commonly Owned Patent Applications, dopant materials, used in conjunction with the precursor metal, favorably influence the oxidation reaction process, particularly in systems employing aluminum as the precursor metal. Additionally, in the practice of the present invention, in certain cases a dopant material may be chosen to, in addition to its doping qualities, provide a second or foreign metal or a source of the same which is desirable to be incorporated into the metallic component of the ceramic body. For example, silicon is a useful dopant material and can also impart desirable characteristics to the metallic component of the ceramic body such as improved high temperature performance in certain systems. Therefore, silicon can be employed in elemental form, or as silicon dioxide, in accordance with the above embodiment, to serve the dual purpose of acting as a dopant material and supplying a source of second metal. However, in some cases, a suitable dopant material will not be available which supplies both the necessary doping characteristics and a source of the desired second or foreign metal. Therefore, a dopant material will need to be used in conjunction with the second or foreign metal. It should be noted, however, that when employing a dopant material in conjunction with a second metal, the presence of each may have an effect upon the function and/or performance of the other. Thus, in practicing the embodiment of the present invention, wherein it is desirable to effect the formation of one or more metallic phases comprising the precursor metal and second metal, and, additionally, a separate dopant material is employed, the respective concentrations of precursor metal and second metal necessary to effect formation of the desired phase(s) may be different than the concentrations necessary to effect formation of the phases in the binary system comprising the precursor metal and second metal. Therefore, care should be taken to consider the effect of all metals present in a specific case when designing a system wherein it is desired to effect the formation of one or more metallic phases within the metallic component of the ceramic body. The dopant or dopants used in conjunction with the precursor metal, as in the case of second metals, (1) may be provided as alloying constituents of the precursor metal, (2) may be applied to at least a portion of the surface of the precursor metal, or (3) may be applied to or incorporated into part or all of the filler material or preform, or any combination of two or more of techniques (1), (2), or (3) may be employed. For example, an alloyed dopant may be used solely or in combination with a second externally applied dopant. In the case of technique (3), wherein additional dopant or dopants are applied to the filler material, the application may be accomplished in any suitable manner as explained in the Commonly Owned Patent Applications.

The function or functions of a particular dopant material can depend upon a number of factors. Such factors include, for example, the particular combination of dopants when two or more dopants are used, the use of an externally applied dopant in combination with a dopant alloyed with the precursor metal, the concentration of dopant employed, the oxidizing environment, process conditions, and as stated above, the identity and concentration of the second metal present.

Dopants useful for an aluminum precursor metal, particularly with air as the oxidant, include magnesium, zinc, and silicon either alone or in combination with each other or in combination with other dopants, as described below. These metals, or a suitable source of the metals, may be alloyed into the aluminum-based precursor metal at concentrations for each of between about 0.1–10% by weight based on the total weight of the resulting doped metal. These dopant materials or a suitable source thereof (e.g. MgO, ZnO, or $SiO_2$) may be used externally to the precursor metal. Thus an alumina ceramic structure is achievable for an aluminum precursor metal using air as the oxidant by using MgO as a dopant in an amount greater than about 0.0008 grams per gram of precursor metal to be oxidized, and greater than about 0.003 grams per square centimeter of precursor metal upon which the MgO is applied. However, the concentration of dopant needed, as discussed above, may depend upon the identity, presence, and concentration of a second or foreign metal.

Additional examples of dopant materials for aluminum precursor metal include sodium, germanium, tin, lead, lithium, calcium, boron, phosphorus, and yttrium which may be used individually or in combination with one or more dopants depending on the oxidant, identity and quantity of second or foreign metal present and process conditions. Rare earth elements such as cerium, lanthanum, praseodymium, neodymium, and samarium are also useful dopants for this system, and herein again especially when used in combination with other dopants. All of the dopant materials, as explained in the Commonly Owned Patent Applications, are effective in promoting polycrystalline oxidation reaction growth for the aluminum-based precursor metal systems.

As disclosed in the above-discussed Copending U.S. application Ser. No. 861,024, a barrier means may be used to inhibit growth or development of the oxidation reaction product beyond the barrier. Suitable barrier means may be any material, compound, element, composition, or the like, which, under the process conditions of this invention, maintains some integrity, is not volatile, and preferably is permeable to the vapor-phase oxidant while being capable of locally inhibiting, poisoning, stopping, interfering with, preventing, or the like, continued growth of oxidation reaction product. Suitable barriers include calcium sulfate (Plaster of Paris), calcium silicate, and Portland cement, and combinations thereof, which typically are applied as a slurry or paste to the surface of the filler material. These barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler bed is especially desirable. For example, if the preform comprises alumina and the resulting ceramic comprises alumina, the barrier may be admixed with alumina particulate, desirably having a mesh size of about 20–1000. Other suitable barriers include refractory ceramics or metal sheaths, which are open on at least one end to permit the vapor-phase oxidant to permeate the bed and contact the molten precursor metal. In certain cases, it may be possible to supply a source of second metal with the barrier means. For example, certain stainless steel compositions, when reacted under certain oxidizing process conditions as at a high temperature in an oxygen-containing atmosphere, form their component oxides such as iron oxide, nickel oxide, or chromium oxide depending on the composition of the stainless steel. Thus, in some cases, a barrier means such as a stainless steel sheath may provide a suitable source of second or foreign metal, and which may effect introduction of second metals such as iron, nickel, or chromium into the flux of molten metal on contact of same.

EXAMPLE 1

In accordance with the present invention, an alumina ceramic body was fabricated such that the metal component contained copper-aluminum intermetallic compounds. Thus, copper was provided as a second metal as a pre-process alloy addition to the precursor metal body.

A $2 \times 1 \times \frac{1}{2}$ inch bar of an aluminum alloy comprising 10 weight percent copper and 3 weight percent magnesium (a dopant), balance aluminum, was placed into a bed of alumina particles (E1 Alundum, from Norton Co., 90 mesh), which was contained in a refractory vessel, such that a $2 \times 1$ inch face of the bar was exposed to the atmosphere and substantially flush with the bed. A thin layer of silicon dioxide dopant material was uniformly dispersed over the exposed surface of the bar. This setup was placed into a furnace and heated up over 5 hours to 1400° C. The furnace was held at 1400° C. for 48 hours, and then cooled down over 5 hours to ambient. The setup was removed from the furnace, and the ceramic body was recovered.

The ceramic structure was cross-sectioned for metallographic and phase analyses. X-ray diffraction analysis of the metallic component of the ceramic showed $Cu_9Al_4$ copper-aluminum intermetallic present toward the top of the structure, and $CuAl_2$ cooper-aluminum intermetallic and non-oxidized aluminum toward the initial growth surface of the ceramic.

EXAMPLE 2

Ceramic materials with an aluminum-based metallic constituent or metallic component enriched in nickel were prepared to determine whether such materials would have enhanced mechanical characteristics. The procedure followed in preparing these materials involved the use of sedimentation casting to make preforms of aluminum oxide particles containing metallic nickel powder. These preforms were subsequently infiltrated with an aluminum oxide ceramic matrix. During the growth process, the molten aluminum interacted with the nickel powder to form a metallic constituent enriched in nickel.

In more detail, either 10% or 30% by weight of nickel metal powder was added to a mixture of aluminum oxide powders (Norton 38 Alundum) consisting of 70% by weight 220 mesh and 30% by weight 500 mesh particle sizes. The resulting blend of oxide and metal particles was slurried in water containing also 2% by weight of a polyvinyl acetate latex binder (Elmer's Wood Glue). The ratio of powder to water (plus binder) was 2.5:1, by weight. Preforms were prepared by pouring the slurry into 2 inch by 2 inch square molds and allowing the solid particles to settle into a layer approximately $\frac{1}{2}$ inch thick. Excess water in the casting process was poured and sponged from the surface.

Each preform was assembled with a $2 \times 2 \times \frac{1}{2}$ inch bar of aluminum alloy 380.1 along a $2 \times 2$ inch common surface with a thin layer of silicon powder placed on the interface as a dopant to promote the oxidation reaction. The 380.1 alloy lot used in these experiments was found by chemical analysis to be consistent with the nominal specification for this alloy (i.e., 7.5–9.5% Si, 3.0–4.0% Cu, <2.9% Zn, <6.0% Fe, <0.5% Mn, <0.5% Ni, <0.35% Sn, and <0.1% Mg), except that the Mg concentration was found to be approximately 0.17% to 0.18% by weight. The higher Mg level is believed to be important in view of the established role of Mg as a dopant or promoter of the oxidation reaction.

The metal/preform assemblies were placed individually in inert refractory boats and surrounded on all sides by a layer of coarse grit wollastonite particles, which served as a barrier material to confine the oxidation reaction to the volume contained within the preform. The refractory boats with their contents were placed in a furnace and heated in air at 1000° C. for 80 hours.

Upon removal from the furnace it was found that an aluminum oxide ceramic matrix had grown from the surface of the molten aluminum alloy and infiltrated the preform. Metallographic examination of cross sections of these materials showed particles of the filler material (38 Alundum) bonded together by an aluminum oxide matrix containing a metallic constituent comprised of aluminum (from the parent metal), silicon (from the parent metal and the dopant layer) and nickel (from the nickel powder added to the preform), plus other minor constituents of the parent metal.

Mechanical properties measurements were obtained on specimens prepared from these ceramic materials. Most noteworthy was an increase in the toughness of the material containing nickel, as determined by a standard Chevron notch fracture toughness test. Thus, the material prepared from the preform with 10% nickel yielded an average toughness value of 8.5 MPa-m$^{1/2}$ while that formed from the 30% nickel preform gave an average toughness of 11.3 MPa-m$^{1/2}$. From prior experience with similar materials, toughness values only in the range of 4–7 in the same units would be expected in the absence of the nickel addition.

EXAMPLE 3

A mixture of fine-grained alumina (80 wt % of Alcan C-75 Alumina, Unground, 100–110 micron average particle size) and nickel metal powder (20 wt % of Atlantic Engineers Nickel Metal Powder, −325 mesh) was prefired in air at 1300° C. for three hours. The nickel and alumin reacted and sintered to form phases of $NiAl_2O_4$ and NiO. It is believed that this $NiAl_2O_4$ and NiO may exist as distinct particles and/or as a coating on the alumina particles. This sintered material was crushed, ball milled, and sieved to −200 mesh. The resulting powder mixture contained approximately 48 percent by weight $NiAl_2O_4$, 42 percent by weight unreacted $Al_2O_3$ and 10 percent by weight NiO. The powder mixture was sediment cast into a $4\frac{1}{2}$ inch by $4\frac{1}{2}$ inch by $\frac{3}{8}$ inch preform using the technique described in Example 2. A 6 inch by 6 inch by 1 inch ingot of 380.1 aluminum alloy was placed below the preform. A surface dopant layer of a foundry material composed primarily of silica and sold under the trademark Leecote®, a registered trademark of Acme Resin Co. of Madison, Ohio, was painted onto the alloy such that it was located adjacent to, and contacted with, the preform (it is noted that the surface dopant layer can also be sprayed onto the alloy and is usually approximately $\frac{1}{8}$ inch or less in thickness). The 380.1 alloy lot used in these experiments was determined through chemical analysis to be consistent with the nominal specification for this alloy (i.e. comprising 7.5–9.5% Si, 3.0–4.0% Cu, <2.9% Zn, <1.5% Fe, <0.5% Mn, <0.5% Ni, <0.35% Sn, and <0.1% Mg), except that the Mg concentration was found to be approximately 0.17% to 0.18% by weight. The higher Mg level is believed to be important in view of the established role of Mg as a dopant or a promoter of the oxidation reaction.

The preform/metal assemblies were placed individually into inert refractory boats and surrounded on all sides by a layer of wollastonite particles (coarse fiber - Nyad SP, from NYCO, Inc.) having a thickness of approximately 3 inches, which particles acted as a barrier material to confine the oxidation reaction to the volume contained within the preform. The refractory boats, with their contents, were placed into an electric resistance furnace and heated in air to a temperature of 1000° C. for 160 hours. The ramp up and ramp down times were both 10 hours.

Upon removal from the furnace, it was found that an aluminum oxide ceramic matrix had grown from the surface of the molten aluminum alloy and had infiltrated the preform. After the infiltrated preform, which constituted the ceramic body, was mechanically separated from the remaining precursor metal carcass, metallographic examinations of cross-sections were performed which showed that a substantially uniform distribution of an interconnected residual metal constituent existed in the ceramic body. Further examination by Energy Dispersive X-Ray Analysis showed that this residual metal consisted of three distinctly different metallic phases with significantly different compositions. The predominant phase contained between 30-50 wt % nickel, 20-30 wt % aluminum, and 20-30 wt % silicon. This nickel-containing intermetallic is referred to herein as the "tailored" residual metal phase. The remaining phases were essentially pure aluminum and pure silicon, and are referred to herein as the "untailored" residual metal. The average density of the produced ceramic bodies was about 3.8 grams/cc.

Without intending to be bound by any particular theory, it is believed that the aluminum oxide matrix is comprised of alumina formed (1) from the oxidation reaction between the precursor metal and the vapor-phase oxidant and (2) from the reduction of the metal aluminate by the precursor metal.

Samples of this ceramic body were exposed to a boiling 20% NaOH solution for time periods of 50 and 100 hours. The extent of attack by the NaOH solution upon the residual metal in the formed ceramic body was minor. Thus, the tailored residual metal resisted dissolution into the boiling 20% NaOH solution. In addition to the resistance to the boiling 20% NaOH solution, the ceramic bodies showed good resistance to corrosive attack in a solution of boiling 1% HCl. From prior experience, it is known that the residual metal in such bodies is extensively attached by either solution in the absence of the nickel addition.

Further tests indicated that the ceramic bodies exhibited excellent erosion resistance. The erosion resistance of the ceramic bodies was determined by a dry grit-blast test, which is described in detail below. Particularly, the erosion rate of the ceramic bodies produced according to this example was determined to be about 0.2-0.4 cc/hour. This erosion resistance is excellent when compared to commercial materials presently being utilized for applications where these ceramic bodies could be utilized. For example, commercial NiHard wear-resistant cast iron materials, when subjected to the same grit-blast test, were found to have an erosion rate of approximately 6.25 cc/hour. Thus, ceramic bodies produced according to this invention could be useful for applications such as erosion/corrosion resistant pieces in industrial slurry handling systems. Such desirable erosion reistance may be attributed to their relatively high surface hardness of 89.5, as determined by the Rockwell A Hardness Scale.

The dry grit-blast test, referred to above, utilizes a modified, pressurized sandblast unit. Foundry sand (80-120 mesh silica, $SiO_2$, obtained from Pennsylvania Foundry Supply and Sand Company, Philadelphia, Pa.) is blasted at a stationary target (test specimen) at a blasting pressure of 40 psi. The test specimen is mounted at a 30° angle incident to the direction of flow of the sand. The blasting nozzle is positioned to be about 3 cm from the test specimen. The test specimen is continuously eroded with the stream of silica sand for 5 minutes. The test specimen is weighed before and after the test and the weight loss and density are used to calculate an erosion rate in cc/hour.

A significant increase in the flexural strength of the resulting ceramic body was obtained by modifying the starting materials used to produce the preform. Particularly, by reducing the particle size of the fine-grained alumina prior to prefiring the alumina powder with nickel metal powder and thereafter subjecting the preforms to the processing parameters discussed above, higher flexural strengths were achieved. The Alcan C-75 Unground Alumina (100-110 micron average particle size) was replaced with Alcan C-75 Regular Ground Alumina (15 micron average particle size). The room temperature flexural strength obtained with the unground alumina was typically between 300-400 MPa. The room temperature flexural strength obtained with the regular ground alumina was typically between 400-530 MPa. In addition, both ceramic materials retained approximately 40 to 60% of their room temperature strength when heated to 700° C. (i.e., temperatures where many "untailored" ceramic bodies retain only a small amount of their room temperature flexural strengths).

The flexural strength determinations were made in a four-point bend testing apparatus utilizing a crosshead speed of 0.5 mm/min. The samples prepared for the flexural strength measurements were bars cut from the prepared ceramic bodies. These test bars had the dimensions of 3 mm×6 mm×45 mm. The tensile surfaces of the bars were surface ground using a 320 mesh diamond wheel, and the corners were chamfered.

The room temperature four-point flexural tests were conducted in a Model CITS 2000 Syntech test machine using the procedures outlined in U.S. Army MIL-STD-1942 (MR). The steel flexure fixture had a 19.95 mm inner span and a 40.06 mm outer span. Flexural strengths were calculated from the peak breaking loads, the specimen dimensions and the fixture dimensions by using elastic beam equations.

The elevated temperature four-point flexural tests were conducted in a Model 1123 Instron test machine with hot-pressed silicon nitride flexure fixtures having an inner span of 19.3 mm and an outer span of 45.3 mm, loaded by silicon carbide push rods. Specimen deflections were measured with a Model 121 Zygo laser precision non-contact measuring device, having 3 micron repeatable accuracy.

These examples demonstrate that by utilizing a bed or preform containing nickel aluminate and, optionally, nickel oxide, it is possible to tailor the residual metal phase of the resulting ceramic body so that it contains a significant weight percentage of nickel-containing intermetallics. The incorporation of a secondary metal or intermetallic into the residual metal of the resulting ceramic body can significantly alter one or more properties of that ceramic body. Ceramic bodies produced by this method exhibit improved corrosion resistance, erosion resistance, room temperature strength, and high temperature strength, relative to ceramic bodies made by a similar method, however, without this secondary metal or intermetallic phase included within the residual metal constituent or component.

EXAMPLE 4

A 2 inch by 1 inch by ½ inch ingot of aluminum alloy 380.1 (having the composition described in Example 3, i.e. comprising 7.5–9.5% Si, 3.0–4.0% Cu, <2.9% Zn, <1.5% Fe, <0.5% Mn, <0.5% Ni, <0.35% Sn, and with a Mg concentration of approximately 0.17% to 0.18% by weight) was completely surrounded with a bed composed of a mixture of 90 grit 38 Alundum and powdered cobalt aluminate in a weight ratio of 10 parts cobalt aluminate to 90 parts 38 Alundum. The ingot, bed and containing refractory boat were placed in a furnace and heated in air to 1150° C. over a 5-hour period. The furnace and its contents were maintained at 1150° C. for 48 hours and then allowed to cool to ambient over a 5-hour period.

Upon removal from the furnace it was found that an aluminum oxide ceramic matrix had grown from the surface of the molten aluminum alloy and infiltrated the bed of alumina and cobalt aluminate. The infiltrated bed, which constituted the ceramic body, was separated from the remaining precursor metal carcass with a diamond saw and then sandblasted to remove any excess filler material. Examination of cross-sections of the resulting ceramic material showed particles of the bedding materials bonded together by an aluminum oxide matrix containing a metallic phase comprised of aluminum (from the precursor metal), silicon (from the precursor metal) and cobalt (reduced from the cobalt aluminate), plus other minor metallic constituents. Further examination using Energy Dispersive X-Ray Analysis revealed the presence of Al, Si, and Co, with a Co/Si intermetallic phase being located throughout the structure.

EXAMPLE 5

A 2 inch by 1 inch by ½ inch ingot of aluminum alloy 380.1 (with the composition described in Example 3, i.e. comprising 7.5–9.5% Si, 3.0–4.0% Cu, <2.9% Zn, <1.5% Fe, <0.5% Mn, <0.5% Ni, <0.35% Sn, and with a Mg concentration of approximately 0.17% to 0.18% by weight) was completely surrounded with a bed composed of a mixture of 90 grit 38 Alundum and powdered cobalt aluminate in a weight ratio of 5 parts cobalt aluminate to 95 parts 38 Alundum. The ingot, bed and containing refractory boat were placed in a furnace and heated in air to 1150° C. over a 5-hour period. The furnace and its contents were maintained at 1150° C. for 48 hours an then allowed to cool to ambient over a 5-hour period.

Upon removal from the furnace it was found that an aluminum oxide ceramic matrix had grown from the surface of the molten aluminum alloy and infiltrated the bed of alumina and cobalt aluminate. The infiltrated bed, which constituted the ceramic body, was separated from the remaining precursor metal carcass with a diamond saw and then sandblasted to remove any excess filler material. Examination of cross-sections of the resulting ceramic material showed particles of the bedding materials bonded together by an aluminum oxide matrix containing a metallic phase comprised of aluminum (from the precursor metal), silicon (from the precursor metal) and cobalt (reduced from the cobalt aluminate), plus other minor metallic constituents. Further examination using Energy Dispersive X-Ray Analysis revealed the presence of Al, Si, and Co, with a Co/Si intermetallic phase being located throughout the structure.

Examples 4 and 5 demonstrate that by utilizing a bed or preform containing cobalt aluminate, it is possible to produce a ceramic material with a metallic constituent containing a quantity of cobalt or an intermetallic of cobalt with at least one other metal.

EXAMPLE 6

A 3½ inch by 3½ inch by 1 inch ingot of aluminum alloy 380.1 (with the composition described in Example 3, i.e., comprising 7.5–9.5% Si, 3.0–4.0% Cu, <2.9% Zn, <1.5% Fe, <0.5% Mn, <0.5% Ni, <0.35% Sn, and with a Mg concentration of approximately 0.17% to 0.18% by weight) was placed in contact with a 3 inch by 3 inch by 1 inch preform comprising 75% by weight C-75 unground alumina (supplied by Alcan Pigments and Chemicals of Cleveland, Ohio), 15% by weight A-17 calcined alumina, from Alcoa (supplied by Whittaker, Clarke and Daniels of South Plainfield, New Jersey) and 10% by weight cobalt aluminate K-4704 (manufactured by Mason Color and Chemical Works, Inc., East Liverpool, Ohio) with an average particle size of 8.8 microns and containing minor amounts of alumina and silica. The forms were sediment cast by the method described in Example 2, except that the slurry contained 4% by weight Elmer's Wood Glue, rather than 2% by weight. Before bringing the ingot and preform into contact, a foundry material composed primarily of silica and sold under the trademark Leecote ®, a registered trademark of Acme Resin Co., of Madison, Ohio, was painted onto the ingot such that it was located adjacent to, and contacted with, the preform.

Six of these preform/metal assemblies were placed individually in inert refractory boats and surrounded on all sides by a layer of wollastonite (coarse fiber - Nyad SP, from NYCO, Inc.) having a thickness of approximately 3 inches, which particles acted as a barrier material to confine the oxidation reaction to the volume contained within the preform. The top surface of the preform (which is the top surface of the preform/metal assembly) was initially left exposed to the atmosphere. The refractory boats, with their contents, were placed into an electric resistance furnace and heated in air to a temperature of 1050° C. and held for 160 hours. The ramp up and ramp down times were both 10 hours.

Upon removal from the furnace, it was found that an aluminum oxide ceramic matrix had grown from the surface of each molten aluminum alloy ingot and had infiltrated each preform. After these infiltrated preforms, which constituted the ceramic bodies, were mechanically separated from the remaining precursor metal carcasses, each preform was tested to determine its hardness. The average hardness of the six ceramic bodies produced by this method was 87.2 as measured on the Rockwell A Hardness Scale. Further tests determined that these bodies had room temperature flexural strengths of 325–384 MPa and high temperature strengths at 700° C. of 179–214 MPa. The average density of these bodies was about 3.77 g/cm$^3$, and the average erosion rate was about 0.22 cc/hour. The flexural strengths and erosion rates were determined by the same procedures set forth in Example 3.

EXAMPLE 7

At 3½ inch by 3½ inch by 1 inch ingot of aluminum alloy 380.1 (with the composition described in Example 3, i.e., comprising 7.5-9.5% Si, 3.0-4.0% Cu, <2.9% Zn, <1.5% Fe, <0.5% Mn, <0.5% Ni, <0.35% Sn, and with a Mg concentration of approximately 0.17%-0.18% by weight) was contacted with a 3 inch by 3 inch by 1 inch preform comprising 75% by weight C-75 unground alumina manufactured by Alcan of Cleveland, Ohio, 15% by weight A-17 calcined alumina, manufactured by Alcoa, and supplied by Whittaker, Clarke and Daniels, of South Plainfield, N.J., and 10% cobalt aluminate 6330 having an average particle size of 9.34 microns and manufactured by Mason Color and Chemical Works, Inc. of East Liverpool, Ohio.

The preforms were sediment cast by the method referred to in Example 6. Before bringing the ingot and preform into contact, a foundry material composed primarily of silica and sold under the trademark Leecote ®, a registered trademark of Acme Resin Co., of Madison, Ohio, was painted onto the ingot such that it was located adjacent to, and contacted with, the preform.

Six of these preform/metal assemblies were placed individually into inert refractory boats and surrounded on all sides by a layer of wollastonite particles (coarse fiber - Nyad SP, of NYCO, Inc.) having a thickness of approximately 3 inches, which particles acted as a barrier material to confine the oxidation reaction to the volume contained within the preforms. The refractory boats, with their contents, were placed into an electric resistance furnace and heated in air to a temperature of 1025° C. for 160 hours. Ramp up and ramp down times were 10 hours.

Upon removal from the furnace, it was found that an aluminum oxide ceramic matrix had grown from the surface of each molten aluminum alloy ingot and had infiltrated each preform. After the infiltrated preforms, which constituted the ceramic bodies, were mechanically separated from the remaining precursor metal carcasses, each ceramic body was tested to determine its hardness. The average hardness of the six ceramic bodies produced by this method was 86.8 as measured on the Rockwell A Hardness Scale. Further tests determined that the ceramic bodies had room temperature flexural strengths of 270-342 MPa and high temperature strengths at 700° C. of 105-122 MPa. The average density of the ceramic bodies was about 3.90 gram/cc and the average erosion rate was about 0.34 cc/hour.

Examples 6 and 7 show that ceramic bodies produced through this method, and using cobalt aluminate as a starting material, displayed properties comparable to these obtained when unground alumina was mixed with nickel aluminate in Example 3.

EXAMPLE 8

The method of Example 3 was repeated except that powders of a commercial alloy known as "Monel", which contains copper and nickel, were utilized in place of the nickel powder. This alloy was used to create ceramic preforms which contained both copper and nickel aluminates. The benefits of using these copper and nickel aluminates is that the matrix growth process can be carried out at lower temperatures due to the fact that different intermetallics which form in the developing ceramic body, such as nickel and copper aluminides. The ceramic bodies produced through this method have mechanical properties which are similiar to the properties displayed by the ceramic bodies produced with nickel aluminate as the starting material.

While the present invention has been described with a certain degree of particularity, it is to be understood that the invention should not be limited to the subject matter described herein, and modifications of the invention which would occur to those skilled in the art, are also intended to be within the spirit of the invention, as defined in the claims appended hereto.

What is claimed is:

1. A method for producing a ceramic body comprising infiltrating a porous bed with an oxidation reaction product obtained by oxidation of a precursor metal to form a polycrystalline material comprising (i) the oxidation reaction product of said precursor metal with a vapor-phase oxidant, and (ii) a metallic constituent, said method comprising the steps of:
    (a) forming a bed comprising at least one metal aluminate, each metal component of each of said at least one metal aluminate consisting of a metal different from said precursor metal;
    (b) orienting said bed and a source of said precursor metal relative to each other so that formation of said oxidation reaction product of said precursor metal will occur into said bed and towards said vapor-phase oxidant;
    (c) heating said source of precursor metal and said bed in the presence of said vapor-phase oxidant to a temperature above the melting point of said precursor metal but below the melting point of said oxidation reaction product to form a body of molten precursor metal;
    (d) reacting said body of molten precursor metal with said vapor-phase oxidant at said temperature to permit said oxidation reaction product to form;
    (e) maintaining at least a portion of said oxidation reaction product in contact with and between said molten precursor metal and said vapor-phase oxidant at said temperature to progressively draw molten precursor metal through said oxidation reaction product towards said vapor-phase oxidant to permit fresh oxidation reaction product to continue to form at an interface between said vapor-phase oxidant and previously formed oxidation reaction product that has infiltrated said bed, and reacting said molten precursor metal with said at least one metal aluminate in said bedding material, thereby liberating said each metal component of each of said at least one metal aluminate; and
    (f) continuing step (e) at said temperature for a time sufficient to infiltrate at least a portion of said bedding material with said polycrystalline material, thereby forming said ceramic body comprising (a) said oxidation reaction product; and (b) a metallic constituent comprising at least one metallic phase, said at least one metallic phase comprising unreacted precursor metal and said each metal component from said at least one metal aluminate.

2. The method of claim 1, wherein said precursor metal comprises aluminum or an aluminum alloy; said vapor-phase oxidant comprises an oxygen-containing gas; and said bedding material consists essentially of at least one material selected from the group consisting of copper aluminate, nickel aluminate, iron aluminate, cobalt aluminate, chromium aluminate and titanium aluminate.

3. The method of claim 2, wherein said oxygen-containing gas is air.

4. The method of claim 1, wherein said bedding material consists essentially of nickel aluminate, said precursor metal comprises aluminum, said vapor-phase oxidant is air, and said resulting ceramic body consists essentially of alumina as said oxidation reaction product embedding, (a) alumina formed upon the reduction of said nickel aluminate and (b) nonoxidized precursor metal nickel, and intermetallics of precursor metal constituents and nickel.

5. The method of claim 1, wherein said each metal component from each of said at least one metal aluminate is distributed substantially uniformly throughout said ceramic body.

6. The method of claim 4, wherein said each metal component from each of said at least one metal aluminate is distributed substantially uniformly throughout said ceramic body.

7. The method of claim 1, comprising the additional step of continuing said oxidation reaction of said precursor metal at said temperature for a time sufficient to deplete said precursor metal is said ceramic body relative to said each metal component reduced from each of said at least one metal aluminate, to cause the formation or enrichment in concentration of said at least one metallic phase of said metallic constituent.

8. The method of claim 1, comprising the additional step of controlled cooling of said ceramic body from said temperature to produce at least one intermetallic in said metallic constituent.

9. The method of claim 1, wherein said at least one metal aluminate is selected from the group consisting of iron aluminate, cobalt aluminate, copper aluminate, nickel aluminate, chromium aluminate, titanium aluminate and mixtures thereof.

10. The method of any one of claims 1, 2, 3, 4, 5, 6, 7, 8 or 9, wherein said porous bed consists of a permeable preform comprising said at least one metal aluminate.

11. The method of any one of claims 1, 2, 3, 4, 5, 6, 7, 8 or 9, wherein said porous bed consists of a permeable preform comprising said at least one metal aluminate mixed with a filler material that is substantially inert under the process conditions.

12. The method of claim 1, wherein said bedding material consists essentially of a powder mixture of alumina and nickel aluminate in about a 50—50 weight percent ratio, said vapor-phase oxidant is air, and said precursor metal comprises aluminum, and said resulting ceramic body consists essentially of alumina as said oxidation reaction product embedding, (i) alumina formed upon the reduction of said nickel aluminate and (ii) nonoxidized precursor metal, nickel, and intermetallics of precursor metal and nickel.

13. The method of any one of claims 1, 2, 3, 4, 5, 6, 7, 8, 9, or 12, including using dopant materials in conjunction with said precursor metal.

14. The method of claim 10, including using dopant materials in conjunction with said precursor metal.

15. The method of claim 11, including using dopant materials in conjunction with said precursor metal.

* * * * *